United States Patent
Zhang et al.

(10) Patent No.: US 9,698,675 B2
(45) Date of Patent: Jul. 4, 2017

(54) DRIVING CIRCUIT, OPERATION METHOD THEREOF AND DISPLAY APPARATUS

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Zhengxin Zhang, Beijing (CN); Shuai Xu, Beijing (CN); Jie Cao, Beijing (CN); Zhiyong Wang, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 91 days.

(21) Appl. No.: 14/427,696

(22) PCT Filed: Jul. 22, 2014

(86) PCT No.: PCT/CN2014/082668
§ 371 (c)(1),
(2) Date: Mar. 12, 2015

(87) PCT Pub. No.: WO2015/109788
PCT Pub. Date: Jul. 30, 2015

(65) Prior Publication Data
US 2015/0372589 A1    Dec. 24, 2015

(30) Foreign Application Priority Data
Jan. 23, 2014    (CN) .......................... 2014 1 0030825

(51) Int. Cl.
*G06F 3/038*    (2013.01)
*G09G 5/00*    (2006.01)
(Continued)

(52) U.S. Cl.
CPC ................ *H02M 3/07* (2013.01); *G09G 3/20* (2013.01); *G09G 3/3258* (2013.01);
(Continued)

(58) Field of Classification Search
CPC .. B60R 16/0231; B60R 16/0315; B60R 25/00
See application file for complete search history.

(56) References Cited

U.S. PATENT DOCUMENTS 6,459,658 B1 * 10/2002 Fujita ..................... G04C 10/00
361/204
8,045,049 B2    10/2011 Watanabe et al.
(Continued)

FOREIGN PATENT DOCUMENTS

CN    2261029 Y    8/1997
CN    1400810 A    3/2003
(Continued)

OTHER PUBLICATIONS

Chinese Office Action of Chinese Application No. 201410030825.8, mailed Sep. 22, 2015 with English translation.
(Continued)

*Primary Examiner* — Alexander Eisen
*Assistant Examiner* — Nan-Ying Yang
(74) *Attorney, Agent, or Firm* — Collard & Roe, P.C.

(57) ABSTRACT

Provided are a driving circuit and its operation method and a display apparatus. The driving circuit comprises a boost circuit unit, a load unit and a voltage monitoring unit, the load unit is connected to a power source providing an initial input voltage, the boost circuit unit is connected to both the load unit and the voltage monitoring unit, the load unit is connected to the voltage monitoring unit; the load unit provides a resistor of fixed resistance value; and the voltage monitoring unit determines whether an actual voltage input into the boost circuit unit is smaller than a predetermined
(Continued)

voltage, and generates a reset signal which is used to control the driving circuit to restart if it is determined that the actual voltage is smaller than the predetermined voltage. The driving circuit can perform self-detection of its own electro-static electricity, and perform self-recovery when detecting that an electro-static current exceeds the maximum current that the driving circuit can withstand, such that the capability of anti electro-static electricity of the display apparatus is improved.

13 Claims, 2 Drawing Sheets

(51) Int. Cl.
*G09G 3/34* (2006.01)
*G09G 3/36* (2006.01)
*H02M 3/07* (2006.01)
*G09G 3/20* (2006.01)
*G09G 3/3258* (2016.01)
*G02F 1/1362* (2006.01)

(52) U.S. Cl.
CPC ..... *G09G 3/3648* (2013.01); *G02F 1/136204* (2013.01); *G09G 2330/023* (2013.01); *G09G 2330/025* (2013.01); *G09G 2330/028* (2013.01); *G09G 2330/04* (2013.01); *G09G 2330/06* (2013.01); *G09G 2330/08* (2013.01)

(56) References Cited

U.S. PATENT DOCUMENTS

| | | | |
|---|---|---|---|
| 2002/0047642 A1* | 4/2002 | Miyagawa | H05B 33/0815 315/307 |
| 2007/0024744 A1 | 2/2007 | Kaehler et al. | |
| 2010/0134450 A1* | 6/2010 | Kong | G09G 3/3406 345/204 |
| 2014/0132492 A1* | 5/2014 | Matsumoto | G09G 3/32 345/84 |

FOREIGN PATENT DOCUMENTS

| | | |
|---|---|---|
| CN | 101932180 A | 12/2010 |
| CN | 102654967 A | 9/2012 |
| CN | 203055409 U | 7/2013 |
| CN | 103295548 A | 9/2013 |
| CN | 103810958 A | 5/2014 |

OTHER PUBLICATIONS

Second Chinese Office Action in Chinese Application No. 201410030825.8, mailed Feb. 22, 2016 with English translation.
International Search Report with Notice of Transmittal of the International Search Report of PCT/CN2014/082668 in Chinese, mailed Sep. 28, 2014.
Written Opinion of PCT/CN2014/082668 in Chinese with English translation, mailed Sep. 28, 2014.
Third Chinese Office Action in Chinese Application No. 201410030825.8, mailed Aug. 1, 2016 with English translation.

* cited by examiner

DRIVING CIRCUIT, OPERATION METHOD THEREOF AND DISPLAY APPARATUS

CROSS REFERNECE TO RELATED APPLICATIONS

This application is the National Stage of PCT/CN2014/082668filed on Jul. 22, 2014, which claims priority under 35 U.S.C. §119 of Chinese Application No. 201410030825.8 files on Jan. 23, 2014, the disclosure of which is incorporated by reference.

TECHNICAL FIELD OF THE DISCLOSURE

The present disclosure relates to a driving circuit and operation method thereof, and a display apparatus.

BACKGROUND

Display devices are subject to various tests before release to detect the performance of the display apparatuses. Electro-static discharge (ESD) test is used to detect the anti electro-static performance of display apparatuses. When performing the ESD test, an ESD device discharges toward a hole (such as an earphone interface, or a USB interface) on the display apparatus in a contact or contactless manner. The electrostatic electricity will transfer to the inside of the display apparatus. If the electro-static current is large, the driving circuit inside the display apparatus will become abnormal. For example, the operation voltage of the boost circuit inside the driving circuit is pulled down to a relatively low level, such that the driving circuit cannot drive the display panel.

According to the ESD standard, the products being detected can be classified into 4 levels of A, B, C and D. For level A, all functions of the product are normal and not disturbed during and after the ESD test. For level B, the product performance is temporarily and trivially influenced during and after the ESD test, but it can recover itself after a period of time. For level C, the product performance is influenced during and after the ESD test, and the product can only recover to normal after restarting the system of the product. For level D, the product completely fails during and after the ESD test and cannot recover.

For strict manufacturers, level C is not acceptable. Therefore, it is necessary to improve the capability of anti electro-static electricity of existing display apparatuses. It is preferred that the driving circuit can self-detect its own electro-static electricity, and when the electro-static current exceeds the biggest current that the driving circuit can withstand, the driving circuit can recover itself.

SUMMARY

At least one embodiment of the present disclosure provides a driving circuit and operation method thereof, and a display apparatus, which can improve the capability of anti electro-static electricity of the driving circuit to improve the ESD level of the products.

At least one embodiment of the present disclosure provides a driving circuit, wherein the driving circuit comprises a boost circuit unit, a load unit and a voltage monitoring unit, the load unit is connected to a power source providing an initial input voltage, the boost circuit unit is connected to both the load unit and the voltage monitoring unit, the load unit is connected to the voltage monitoring unit; the load unit provides a resistor of fixed resistance value; and the voltage monitoring unit determines whether an actual voltage input into the boost circuit unit is smaller than a predetermined voltage, and generates a reset signal which is used to control the driving circuit to restart if it is determined that the actual voltage is smaller than the predetermined voltage.

Optionally, the boost circuit unit comprises an oscillator and a charge pump, and the charge pump is connected to the load unit and the voltage monitoring unit.

Optionally, the voltage monitoring unit comprises a voltage comparator, a signal input circuit and a logic circuit;

an inverting input terminal of the voltage comparator is connected to the boost circuit unit, the signal input circuit is connected to an output terminal of the voltage comparator, a second input terminal of the logic circuit is connected to the signal input circuit, a non-inverting input terminal of the voltage comparator is input with the predetermined voltage, and a first input terminal of the logic circuit is input with a high level signal;

the voltage comparator outputs a corresponding control voltage based on the actual voltage and the predetermined voltage;

the signal input circuit determines whether the voltage value of the control voltage is positive, if it is determined that the voltage value of the control voltage is positive, inputs a high level signal to the logic circuit, and if it is determined that the voltage value of the control voltage is negative, inputs a low level signal to the logic circuit; and the logic circuit determines whether both a signal input by the first input terminal and a signal input by the second input terminal are high level signals, and generates the reset signal if it is determined that both the signal input by the first input terminal and the signal input by the second input terminal are high level signals.

Optionally, the signal input circuit comprises a N type transistor and a P type transistor, a gate of the N type transistor is connected to the output terminal of the voltage comparator, a source of the N type transistor is input with a high level signal, a drain of the N type transistor is connected to the second input terminal of the logic circuit, a gate of the P type transistor is connected to the output terminal of the voltage comparator, a source of the P type transistor is input with a low level signal, and a drain of the P type transistor is connected to the second input terminal of the logic circuit.

At least one embodiment of the present disclosure provides a display apparatus, wherein the display apparatus comprises a driving circuit which adopts the driving circuit described above.

At least one embodiment of the present disclosure provides an operation method of a driving circuit, wherein the driving circuit comprises a boost circuit unit, a load unit and a voltage monitoring unit, the load unit is connected to a power source providing an initial input voltage, the boost circuit unit is connected to both the load unit and the voltage monitoring unit, the load unit is connected to the voltage monitoring unit; the load unit provides a resistor of fixed resistance value, and the operation method of the driving circuit comprises:

the voltage monitoring unit determining whether an actual voltage input into the boost circuit unit is smaller than a predetermined voltage, and generating a reset signal which is used to control the driving circuit to restart if it is determined that the actual voltage is smaller than the predetermined voltage.

Optionally, the voltage monitoring unit comprises a voltage comparator, a signal input circuit and a logic circuit; an inverting input terminal of the voltage comparator is connected to the boost circuit unit, the signal input circuit is connected to an output terminal of the voltage comparator, a second input terminal of the logic circuit is connected to the signal input circuit, a non-inverting input terminal of the voltage comparator is input with the predetermined voltage, and a first input terminal of the logic circuit is input with a high level signal;

the voltage monitoring unit determining whether an actual voltage input into the boost circuit unit is smaller than a predetermined voltage comprises:

the voltage comparator outputting a corresponding control voltage based on the actual voltage and the predetermined voltage;

the signal input circuit determining whether the voltage value of the control voltage is positive, if it is determined that the voltage value of the control voltage is positive, inputting a high level signal to the logic circuit, and if it is determined that the voltage value of the control voltage is negative, inputting a low level signal to the logic circuit; and the logic circuit determining whether both a signal input by the first input terminal and a signal input by the second input terminal are high level signals, and generating the reset signal if it is determined that both the signal input by the first input terminal and the signal input by the second input terminal are high level signals.

Optionally, the signal input circuit comprises a N type transistor and a P type transistor, a gate of the N type transistor is connected to the output terminal of the voltage comparator, a source of the N type transistor is input with a high level signal, a drain of the N type transistor is connected to the second input terminal of the logic circuit, a gate of the P type transistor is connected to the output terminal of the voltage comparator, a source of the P type transistor is input with a low level signal, and a drain of the P type transistor is connected to the second input terminal of the logic circuit.

At least one embodiment of the present disclosure can achieve the following advantages. The voltage monitoring unit determines whether an actual voltage input into the boost circuit unit is smaller than a predetermined voltage, and generates a reset signal if it is determined that the actual voltage is smaller than the predetermined voltage. The reset signal is used to control the driving circuit to restart such that the driving circuit recovers to normal.

DETAILED DESCRIPTION

In order for those skilled in the art to better understand the technical solutions of the present disclosure, detailed descriptions will be made on the driving circuit, driving method thereof and the display apparatus provided by the present disclosure in connection with the accompanying figures in the following.

First Embodiment

Figure 1:
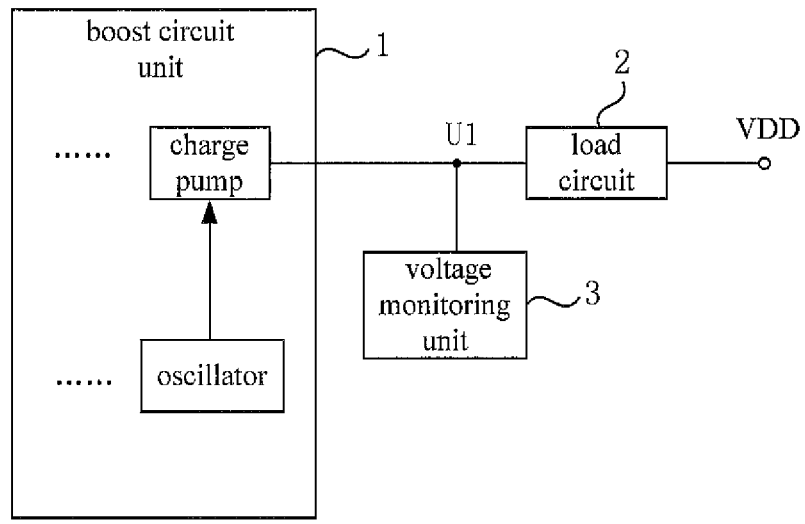
FIG. 1 is a driving circuit provided by a first embodiment of the present disclosure.

FIG. 1 is a driving circuit provided by the first embodiment of the present disclosure. As shown in FIG. 1, the driving circuit comprises a boost circuit unit 1, a load unit 2 and a voltage monitoring unit 3. The load unit 2 is connected to a power source providing an initial input voltage VDD, the boost circuit unit 1 is connected to both the load unit 2 and the voltage monitoring unit 3, the load unit 2 is connected to the voltage monitoring unit 3; the load unit 2 provides a resistor of fixed resistance value; and the voltage monitoring unit 3 determines whether an actual voltage input into the boost circuit unit 1 is smaller than a predetermined voltage, and generates a reset signal which is used to control the driving circuit to restart if it is determined that the actual voltage is smaller than the predetermined voltage.

It is noted that the embodiment of the present disclosure detects the amplitude of the electro-static current within the driving circuit by determining the amplitude of the actual voltage input into the boost circuit unit 1 with respect to that of the predetermined voltage. For example, when it is determined that the actual voltage is larger than or equal to the predetermined voltage, it means that the voltage shared by the load unit 2 is small. Additionally, since the resistance value of the load unit 2 is fixed, it can be derived that the current through the load unit 2 is small. Then, it can be known that the electro-static current within the driving circuit is small, now the driving circuit is in a normal state, and the display apparatus can display normally. Similar to the above derivation procedure, when it is determined that the actual voltage is smaller than the predetermined voltage, it means that the electro-static current within the driving circuit is large, now the driving circuit is in an abnormal state, the display apparatus cannot display nom ally, and it is necessary to restart the driving circuit.

It is noted that the load unit 2 provides a resistor of fixed resistance value for voltage-division of the power source. For example, the load unit 2 can be an element with fixed resistance value, or can be a combination of multiple elements that are connected in parallel and/or in series to be equivalent to a fixed resistance value. Further, in practical design process, it is possible to correspondingly adjust the amplitude of the fixed resistance value according to the actual operation situation of the driving circuit, and the amplitude of the predetermined voltage also needs corresponding adjustment at the same time.

The driving circuit in the present embodiment can detect its own electro-static electricity, and when the electro-static current within the driving circuit is large, it can restart by itself such that the driving circuit can recover to normal. More importantly, since it takes extremely short time for the restart procedure (finished instantly), the user cannot feel it, and thus it will not influence the use of the display apparatus by the user.

Optionally, the boost circuit unit 1 comprises an oscillator and a charge pump, and the charge pump is connected to the load unit 2 and the voltage monitoring unit 3.

Figure 2:
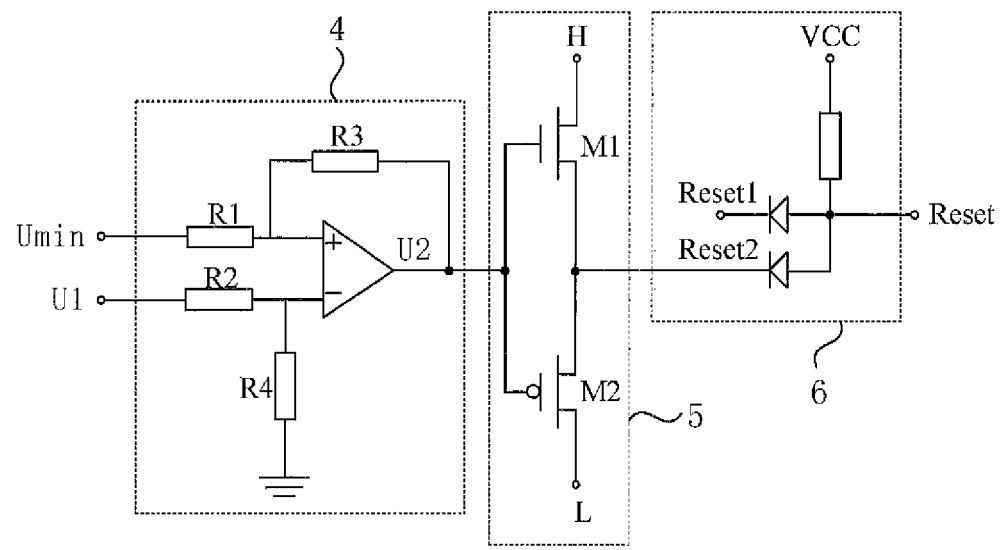
FIG. 2 is a schematic diagram of the voltage monitoring unit in FIG. 1.

FIG. 2 is a schematic diagram of the voltage monitoring unit shown in FIG. 1. As shown in FIG. 2, the voltage monitoring unit 3 can comprise a voltage comparator 4, a signal input circuit 5 and a logic circuit 6, an inverting input terminal of the voltage comparator 4 is connected to the boost circuit unit 1, the signal input circuit 5 is connected to an output terminal of the voltage comparator 4, a second input terminal of the logic circuit 6 is connected to the signal input circuit 5, a non-inverting input terminal of the voltage comparator 4 is input with the predetermined voltage, a first input terminal of the logic circuit 6 is input with a high level signal, the voltage comparator 4 is used to output a corresponding control voltage based on the actual voltage and the predetermined voltage; the signal input circuit 5 is used to determine whether the voltage value of the control voltage is positive, if it is determined that the voltage value of the control voltage is positive, input a high level signal H to the logic circuit 6, and if it is determined that the voltage value of the control voltage is negative, input a low level signal L to the logic circuit 6; and the logic circuit 6 is used to determine whether both a signal input by the first input terminal and a signal input by the second input terminal are high level signals, and generate the reset signal if it is determined that both the signal input by the first input terminal and the signal input by the second input terminal are high level signals.

The signal input circuit comprises a N type transistor M1 and a P type transistor M2, a gate of the N type transistor M1 is connected to the output terminal of the voltage comparator 4, a source of the N type transistor M1 is input with a high level signal H, a drain of the N type transistor M1 is connected to the second input terminal of the logic circuit 6, a gate of the P type transistor M2 is connected to the output terminal of the voltage comparator 4, a source of the P type transistor M2 is input with a low level signal L, and a drain of the P type transistor M2 is connected to the second input terminal of the logic circuit 6.

In the following, the principle of the present disclosure will be described in detail with reference to FIG. 2.

In FIG. 2, Umin is the predetermined voltage, U1 is the actual voltage (the voltage input into the boost circuit unit 1), U2 is the control voltage, Reset1 is the input signal of the first input terminal of the logic circuit 6, Reset2 is the signal input into the second input terminal of the logic circuit 6 by the signal input circuit 5, and Reset is the reset signal. In addition, the resistors R1, R2, R3 and R4 in the voltage comparator 4 have the same resistance value, and thus U2=Umin−U1.

The procedure of the self detection of its own electro-static electricity performed by the driving circuit realized by an embodiment of the present disclosure is as follows.

First, the voltage comparator 4 can output the control voltage U2 based on the actual voltage U1 and the predetermined voltage Umin.

Then, the signal input circuit 5 can selectively output a high level signal or a low level signal according to the control voltage U2.

For example, when the actual voltage U1 is smaller than the predetermined voltage Umin, the voltage value of the control voltage U2 is positive, now the N type transistor M1 is turned on, the P type transistor M2 is turned off, and now the Reset 2 is a high level signal. When the actual voltage U1 is larger than the predetermined voltage Umin, the voltage value of the control voltage U2 is negative, now the P type transistor M2 is turned on, the N type transistor M1 is turned off, and now Reset2 is a low level signal.

Finally, the logic circuit 6 controls whether to generate the reset signal Reset according to the input signal Reset1 of the first input terminal and the input signal Reset2 of the second input terminal.

For example, when at least one of Reset1 and Reset2 is a low level signal, the logic circuit 6 outputs a normal signal such that the driving circuit operates normally. When both of Reset1 and Reset2 are high level signals, the logic circuit 6 outputs the reset signal Reset for restarting the driving circuit. It is noted that a reset module (not shown in the figure) is provided in the boost circuit unit, and the reset module is used to restart the driving circuit when receiving the reset signal Reset. When the driving circuit restarts, the electro-static electricity in the driving circuit is released, the electro-static current decreases, and the driving circuit realizes self-recovery, thus improving the capability of anti electro-static electricity of the driving circuit.

It is noted that the logic circuit 6 in the present embodiment is not limited to an "AND" circuit, and the reset signal Reset is not limited, which can be configured as needed. For example, the logic circuit 6 can be an "AND" circuit or a "NAND" circuit. When the logic circuit 6 is an "AND" circuit, the output reset signal Reset is a high level signal, and when the logic circuit 6 is a "NAND" circuit, the output reset signal Reset is a low level signal.

It is noted that in the embodiments of the disclosure, the predetermined voltage Umin can be correspondingly designed according to the initial input voltage VDD, the resistance value R of the load unit and the normal operation current I of the driving circuit. Assuming the largest current that the driving circuit can withstand is one and a half of the normal operation current, Umin=VDD−1.5*R*I. Of course, the calculation method of the predetermined voltage provided in the embodiment of the present disclosure is only for illustration, the predetermined voltage Umin can also be correspondingly designed according to practical situations.

The first embodiment of the present disclosure provides a driving circuit. The driving circuit comprises a boost circuit unit, a load unit and a voltage monitoring unit, the load unit is connected to a power source providing an initial input voltage, the boost circuit unit is connected to both the load unit and the voltage monitoring unit, the load unit is connected to the voltage monitoring unit; the voltage monitoring unit is used to determine whether an actual voltage input into the boost circuit unit is smaller than a predetermined voltage, and to generate a reset signal which is used to control the driving circuit to restart if it is determined that the actual voltage is smaller than the predetermined voltage. The driving circuit in the embodiment of the present disclosure can perform self-detection of its own electro-static electricity, and perform self-recovery when detecting that the electro-static current exceeds the maximum current that the driving circuit can withstand, such that the capability of anti electro-static electricity of the display apparatus is improved.

Second Embodiment

The second embodiment of the present disclosure provides a display apparatus, and the display apparatus comprises a driving circuit which adopts the driving circuit provided by the above first embodiment. For details, please refer to the description of the above first embodiment, which will not be described repeatedly here.

It is noted that the display apparatus in the embodiment of the present disclosure can be any product or means with any display function, such as a liquid crystal panel, an electronic paper, an OLED panel, a liquid crystal TV set, a liquid crystal display, a digital photo frame, a cell phone, a tablet or the like.

The second embodiment of the present disclosure provides a display apparatus which comprises a driving circuit. The driving circuit comprises a boost circuit unit, a load unit and a voltage monitoring unit, the load unit is connected to a power source providing an initial input voltage, the boost circuit unit is connected to both the load unit and the voltage monitoring unit, the load unit is connected to the voltage monitoring unit; the voltage monitoring unit is used to determine whether an actual voltage input into the boost circuit unit is smaller than a predetermined voltage, and to generate a reset signal which is used to control the driving circuit to restart if it is determined that the actual voltage is smaller than the predetermined voltage. The driving circuit in the embodiment of the present disclosure can perform self-detection of its own electro-static electricity, and perform self-recovery when detecting that an electro-static current exceeds the maximum current that the driving circuit can withstand, such that the capability of anti electro-static electricity of the display apparatus is improved.

Third Embodiment

The third embodiment of the present disclosure provides an operation method of a driving circuit. The driving circuit comprises a boost circuit unit, a load unit and a voltage monitoring unit, the load unit is connected to a power source providing an initial input voltage, the boost circuit unit is connected to both the load unit and the voltage monitoring unit, the load unit is connected to the voltage monitoring unit; the load unit provides a resistor of fixed resistance value. The operation method of the driving circuit comprises: the voltage monitoring unit determining whether an actual voltage input into the boost circuit unit is smaller than a predetermined voltage, and generating a reset signal which is used to control the driving circuit to restart if it is determined that the actual voltage is smaller than the predetermined voltage.

It is noted that the embodiment of the present disclosure detects the amplitude of the electro-static current within the driving circuit by determining the amplitude of the actual voltage input into the boost circuit unit with respect to that of the predetermined voltage. For example, when it is determined that the actual voltage is larger than or equal to the predetermined voltage, it means that the electro-static current within the driving circuit is small, now the driving circuit is in a normal state, and the display apparatus can display normally. When it is determined that the actual voltage is smaller than the predetermined voltage, it means that the electro-static current within the driving circuit is large, now the driving circuit is in an abnormal state, the display apparatus cannot display normally, and it is necessary to restart the driving circuit.

The driving circuit can detect its own electro-static electricity, and when an electro-static current within the driving circuit is large, it can restart by itself such that the driving circuit can recover to normal. More importantly, since it takes extremely short time for the restart procedure (finished instantly), the user cannot feel it, and thus it will not influence the use of the display apparatus by the user.

The third embodiment of the present disclosure provides an operation method of a driving circuit, wherein the voltage monitoring unit determines whether the actual voltage input into the boost circuit unit is smaller than a predetermined voltage, and generates a reset signal for controlling the driving circuit to restart when it is determined that the actual voltage is smaller than the predetermined voltage. The operation method of the driving circuit in the embodiment of the present disclosure can perform self-detection of its own electro-static electricity of the driving circuit, and perform self-recovery when detecting that the electro-static current exceeds the maximum current that the driving circuit can withstand, such that the capability of anti electro-static electricity of the display apparatus is improved.

Fourth Embodiment

The fourth embodiment of the present disclosure provides an operation method of a driving circuit, wherein the driving circuit comprises a boost circuit unit, a load unit and a voltage monitoring unit, the load unit is connected to a power source providing an initial input voltage, the boost circuit unit is connected to both the load unit and the voltage monitoring unit, the load unit is connected to the voltage monitoring unit; the load unit provides a resistor of fixed resistance value.

For example, the voltage monitoring comprises a voltage comparator, a signal input circuit and a logic circuit; an inverting input terminal of the voltage comparator is connected to the boost circuit unit, the signal input circuit is connected to an output terminal of the voltage comparator, a second input terminal of the logic circuit is connected to the signal input circuit, a non-inverting input terminal of the voltage comparator is input with the predetermined voltage, and a first input terminal of the logic circuit is input with a high level signal.

Figure 3:
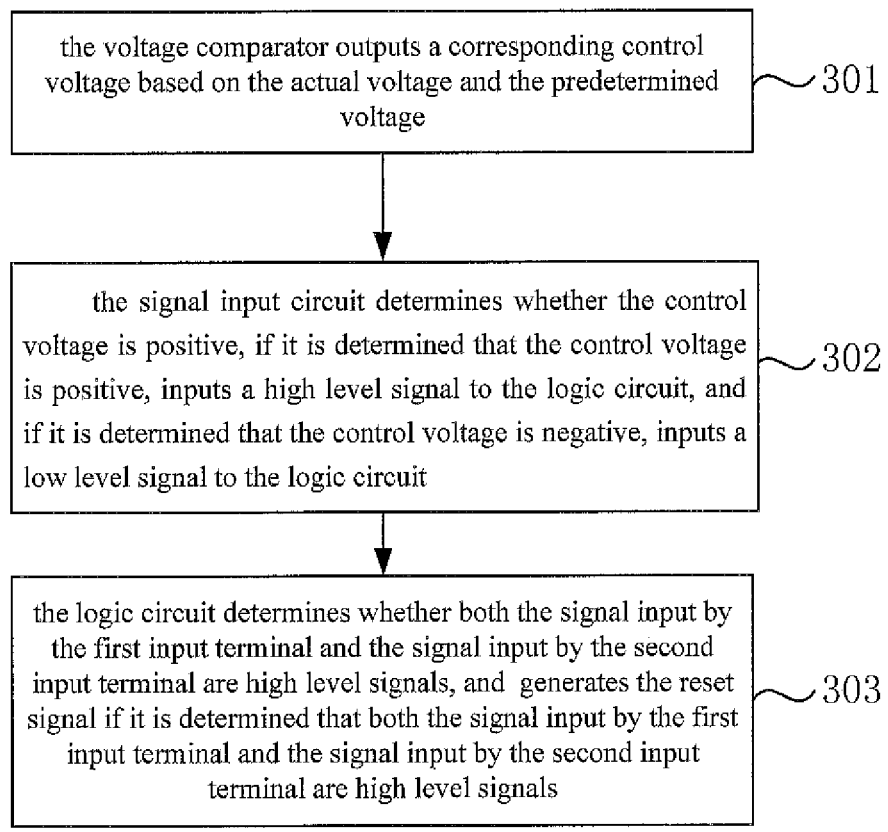
FIG. 3 is a flowchart of an operation method of a driving circuit provided by a fourth embodiment of the present disclosure.

FIG. 3 is a flowchart of the operation method of a driving circuit provided by the fourth embodiment of the present disclosure. As shown FIG. 3, the operation method of the driving circuit comprises the following steps 301-303.

At step 301, the voltage comparator outputs a corresponding control voltage based on the actual voltage and the predetermined voltage.

Referring to FIG. 2, the voltage comparator 4 can output the control voltage U2 based on the actual voltage U1 and the predetermined voltage Umin. In the present embodiment, the resistors R1, R2, R3 and R4 have the same resistance value, and then U2=Umin−U1.

At step 302, the signal input circuit determines whether the control voltage is positive, if it is determined that the control voltage is positive, inputs a high level signal to the logic circuit, and if it is determined that the control voltage is negative, inputs a low level signal to the logic circuit.

Referring to FIG. 2, optionally, the signal input circuit 5 comprises a N type transistor M1 and a P type transistor M2, a gate of the N type transistor M1 is connected to the output terminal of the voltage comparator 4, a source of the N type transistor M1 is input with a high level signal H, a drain of the N type transistor M1 is connected to the second input terminal of the logic circuit, a gate of the P type transistor M2 is connected to the output terminal of the voltage comparator, a source of the P type transistor M2 is input with a low level signal L, and a drain of the P type transistor M2 is connected to the second input terminal of the logic circuit.

At step 302, when the actual voltage U1 is smaller than the predetermined voltage Umin, the voltage value of the control voltage U2 is positive, now the N type transistor M1 is turned on, the P type transistor M2 is turned off, and now the Reset 2 is a high level signal. When the actual voltage U1 is larger than the predetermined voltage Umin, the voltage value of the control voltage U2 is negative, now the P type transistor M2 is turned on the N type transistor M1 is turned off, and now Reset2 is a low level signal.

At step 303, the logic circuit determines whether both a signal input by the first input terminal and a signal input by the second input terminal are high level signals, and generates the reset: signal if it is determined that both the signal input by the first input terminal and the signal input by the second input terminal are high level signals.

Referring to FIG. 2, at step 303, the logic circuit 6 controls whether to generate the reset signal according to the input signal Reset1 of the first input terminal and the input signal Reset2 of the second input terminal. For example, when at least one of Reset1 and Reset2 is a low level signal, the logic circuit 6 outputs a normal signal such that the driving circuit operates normally. When both of Reset1 and Reset2 are a high level signal, the logic circuit 6 outputs the reset signal for restarting the driving circuit. When the driving circuit restarts, the electro-static electricity in the driving circuit is released, the electro-static current decreases, and the driving circuit realizes self-recovery, so as to improve the capability of anti electro-static electricity of the driving circuit. It is noted that the logic circuit 6 in the present embodiment can be an "AND" circuit.

The fourth embodiment of the present disclosure provides an operation method of a driving circuit. The operation method for the driving circuit can perform self-detection of its own electro-static electricity of the driving circuit, and perform self-recovery when detecting that an electro-static current exceeds the maximum current that the driving circuit can withstand, such that the capability of anti electro-static electricity of the display apparatus is improved.

It can be understood that the above embodiments are only exemplary embodiments adopted for illustrating the principle of the present disclosure; however, the present disclosure are not limited to that. For those skilled in the art, various modifications and improvements can be made without departing from the spirit and essence of the present disclosure, and those modifications and improvements are also intended to fall in the protection scope of the present disclosure.

The present application claims the priority of Chinese Patent Application No. 201410030825.8 filed on Jan. 23, 2014, entire content of which is incorporated as part of the present invention by reference.

What is claimed is:

1. A driving circuit, comprising a boost circuit unit, a load unit and a voltage monitoring unit, the load unit is connected to a power source providing an initial input voltage, the boost circuit unit is connected to both the load unit and the voltage monitoring unit, the load unit is connected to the voltage monitoring unit;

the load unit provides a resistor of fixed resistance value; and the voltage monitoring unit determines whether an actual voltage input into the boost circuit unit is smaller than a predetermined voltage, and generates a reset signal which is used to control the driving circuit to restart if it is determined that the actual voltage is smaller than the predetermined voltage;

wherein the voltage monitoring unit comprises a voltage comparator, a signal input circuit and a logic circuit;

an inverting input terminal of the voltage comparator is connected to the boost circuit unit, the signal input circuit is connected to an output terminal of the voltage comparator, a second input terminal of the logic circuit is connected to the signal input circuit, a non-inverting input terminal of the voltage comparator is input with the predetermined voltage, and a first input terminal of the logic circuit is input with a high level signal;

the voltage comparator outputs a corresponding control voltage based on the actual voltage and the predetermined voltage;

the signal input circuit determines whether the voltage value of the control voltage is positive, if it is determined that the voltage value of the control voltage is positive, inputs a high level signal to the logic circuit, and if it is determined that the voltage value of the control voltage is negative, inputs a low level signal to the logic circuit; and the logic circuit determines whether both a signal input by the first input terminal and a signal input by the second input terminal are high level signals, and generates a reset signal if it is determined that both the signal input by the first input terminal and the signal input by the second input terminal are high level signals.

2. The driving circuit according to claim 1, wherein the boost circuit unit comprises an oscillator and a charge pump, and the charge pump is connected to the load unit and the voltage monitoring unit.

3. The driving circuit according to claim 1, wherein the signal input circuit comprises a N type transistor and a P type transistor, a gate of the N type transistor is connected to the output terminal of the voltage comparator, a source of the N type transistor is input with a high level signal, a drain of the N type transistor is connected to the second input terminal of the logic circuit, a gate of the P type transistor is connected to the output terminal of the voltage comparator, a source of the P type transistor is input with a low level signal, and a drain of the P type transistor is connected to the second input terminal of the logic circuit.

4. A display apparatus comprising a driving circuit which adopts the driving circuit according to claim 1.

5. An operation method of a driving circuit which comprises a boost circuit unit, a load unit and a voltage monitoring unit, the load unit is connected to a power source providing an initial input voltage, the boost circuit unit is connected to both the load unit and the voltage monitoring unit, the load unit is connected to the voltage monitoring unit; the load unit provides a resistor of fixed resistance value, and the operation method of a driving circuit comprises:

the voltage monitoring unit determining whether an actual voltage input into the boost circuit unit is smaller than a predetermined voltage, and generating a reset signal which is used to control the driving circuit to restart if it is determined that the actual voltage is smaller than the predetermined voltage;

wherein the voltage monitoring unit comprises a voltage comparator, a signal input circuit and a logic circuit; an inverting input terminal of the voltage comparator is connected to the boost circuit unit, the signal input circuit is connected to an output terminal of the voltage comparator, a second input terminal of the logic circuit is connected to the signal input circuit, a non-inverting input terminal of the voltage comparator is input with the predetermined voltage, and a first input terminal of the logic circuit is input with a high level signal;

the voltage monitoring unit determining whether an actual voltage input into the boost circuit unit is smaller than a predetermined voltage comprises:

the voltage comparator outputting a corresponding control voltage based on the actual voltage and the predetermined voltage;

the signal input circuit determining whether the voltage value of the control voltage is positive, if it is determined that the voltage value of the control voltage is positive, inputting a high level signal to the logic circuit, and if it is determined that the voltage value of the control voltage is negative, inputting a low level signal to the logic circuit; and the logic circuit determining whether both a signal input by the first input terminal and a signal input by the second input terminal are high level signals, and generating the reset signal if it is determined that both the signal input by the first input terminal and the signal input by the second input terminal are high level signals.

6. The operation method of the driving circuit according to claim 5, wherein the signal input circuit comprises a N type transistor and a P type transistor, a gate of the N type transistor is connected to the output terminal of the voltage comparator, a source of the N type transistor is input with a high level signal, a drain of the N type transistor is connected to the second input terminal of the logic circuit, a gate of the P type transistor is connected to the output terminal of the voltage comparator, a source of the P type transistor is input with a low level signal, and a drain of the P type transistor is connected to the second input terminal of the logic circuit.

7. The driving circuit according to claim 2, wherein the voltage monitoring unit comprises a voltage comparator, a signal input circuit and a logic circuit;
    an inverting input terminal of the voltage comparator is connected to the boost circuit unit, the signal input circuit is connected to an output terminal of the voltage comparator, a second input terminal of the logic circuit is connected to the signal input circuit, a non-inverting input terminal of the voltage comparator is input with the predetermined voltage, and a first input terminal of the logic circuit is input with a high level signal;
    the voltage comparator outputs a corresponding control voltage based on the actual voltage and the predetermined voltage;
    the signal input circuit determines whether the voltage value of the control voltage is positive, if it is determined that the voltage value of the control voltage is positive, inputs a high level signal to the logic circuit, and if it is determined that the voltage value of the control voltage is negative, inputs a low level signal to the logic circuit; and
    the logic circuit determines whether both a signal input by the first input terminal and a signal input by the second input terminal are high level signals, and generates the reset signal if it is determined that both the signal input by the first input terminal and the signal input by the second input terminal are high level signals.

8. The driving circuit according to claim 7, wherein the signal input circuit comprises a N type transistor and a P type transistor, a gate of the N type transistor is connected to the output terminal of the voltage comparator, a source of the N type transistor is input with a high level signal, a drain of the N type transistor is connected to the second input terminal of the logic circuit, a gate of the P type transistor is connected to the output terminal of the voltage comparator, a source of the P type transistor is input with a low level signal, and a drain of the P type transistor is connected to the second input terminal of the logic circuit.

9. The display apparatus according to claim 4, wherein the boost circuit unit comprises an oscillator and a charge pump, and the charge pump is connected to the load unit and the voltage monitoring unit.

10. The display apparatus according to claim 4, wherein the voltage monitoring unit comprises a voltage comparator, a signal input circuit and a logic circuit;
    an inverting input terminal of the voltage comparator is connected to the boost circuit unit, the signal input circuit is connected to an output terminal of the voltage comparator, a second input terminal of the logic circuit is connected to the signal input circuit, a non-inverting input terminal of the voltage comparator is input with the predetermined voltage, and a first input terminal of the logic circuit is input with a high level signal;
    the voltage comparator outputs a corresponding control voltage based on the actual voltage and the predetermined voltage;
    the signal input circuit determines whether the voltage value of the control voltage is positive, if it is determined that the voltage value of the control voltage is positive, inputs a high level signal to the logic circuit, and if it is determined that the voltage value of the control voltage is negative, inputs a low level signal to the logic circuit; and
    the logic circuit determines whether both a signal input by the first input terminal and a signal input by the second input terminal are high level signals, and generates the reset signal if it is determined that both the signal input by the first input terminal and the signal input by the second input terminal are high level signals.

11. The display apparatus according to claim 10, wherein the signal input circuit comprises a N type transistor and a P type transistor, a gate of the N type transistor is connected to the output terminal of the voltage comparator, a source of the N type transistor is input with a high level signal, a drain of the N type transistor is connected to the second input terminal of the logic circuit, a gate of the P type transistor is connected to the output terminal of the voltage comparator, a source of the P type transistor is input with a low level signal, and a drain of the P type transistor is connected to the second input terminal of the logic circuit.

12. The display apparatus according to claim 9, wherein the voltage monitoring unit comprises a voltage comparator, a signal input circuit and a logic circuit;
    an inverting input terminal of the voltage comparator is connected to the boost circuit unit, the signal input circuit is connected to an output terminal of the voltage comparator, a second input terminal of the logic circuit is connected to the signal input circuit, a non-inverting input terminal of the voltage comparator is input with the predetermined voltage, and a first input terminal of the logic circuit is input with a high level signal;
    the voltage comparator outputs a corresponding control voltage based on the actual voltage and the predetermined voltage;
    the signal input circuit determines whether the voltage value of the control voltage is positive, if it is determined that the voltage value of the control voltage is positive, inputs a high level signal to the logic circuit, and if it is determined that the voltage value of the control voltage is negative, inputs a low level signal to the logic circuit; and
    the logic circuit determines whether both a signal input by the first input terminal and a signal input by the second input terminal are high level signals, and generates the reset signal if it is determined that both the signal input by the first input terminal and the signal input by the second input terminal are high level signals.

13. The display apparatus according to claim 12, wherein the signal input circuit comprises a N type transistor and a P type transistor, a gate of the N type transistor is connected to the output terminal of the voltage comparator, a source of the N type transistor is input with a high level signal, a drain of the N type transistor is connected to the second input terminal of the logic circuit, a gate of the P type transistor is connected to the output terminal of the voltage comparator, a source of the P type transistor is input with a low level signal, and a drain of the P type transistor is connected to the second input terminal of the logic circuit.

* * * * *